United States Patent
Peiris et al.

(10) Patent No.: US 10,244,042 B2
(45) Date of Patent: *Mar. 26, 2019

(54) PUSHING SUGGESTED SEARCH QUERIES TO MOBILE DEVICES

(71) Applicant: Facebook, Inc., Menlo Park, CA (US)

(72) Inventors: Keith L. Peiris, San Francisco, CA (US); Peter Deng, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/925,800

(22) Filed: Oct. 28, 2015

(65) Prior Publication Data

US 2016/0050540 A1 Feb. 18, 2016

Related U.S. Application Data

(63) Continuation of application No. 13/776,469, filed on Feb. 25, 2013, now Pat. No. 9,223,826.

(51) Int. Cl.
*G06F 16/242* (2019.01)
*G06F 16/332* (2019.01)
*H04L 29/08* (2006.01)
*G06F 16/9032* (2019.01)
*H04W 4/14* (2009.01)
*H04W 4/029* (2018.01)

(52) U.S. Cl.
CPC .......... *H04L 67/10* (2013.01); *G06F 16/243* (2019.01); *G06F 16/3322* (2019.01); *G06F 16/90324* (2019.01); *H04W 4/029* (2018.02); *H04W 4/14* (2013.01)

(58) Field of Classification Search
USPC .......................................... 707/723, 748, 767
See application file for complete search history.

(56) References Cited

U.S. PATENT DOCUMENTS

| | | | |
|---|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |

(Continued)

FOREIGN PATENT DOCUMENTS

| | | |
|---|---|---|
| WO | WO 2011/068760 A2 | 6/2011 |
| WO | WO 2011/159475 A1 | 12/2011 |

(Continued)

OTHER PUBLICATIONS

Australian Government Patent Examination Report No. 1 for AU Patent Application No. 2014218672, dated Nov. 26, 2015.

(Continued)

*Primary Examiner* — Cam Linh T Nguyen
(74) *Attorney, Agent, or Firm* — Baker Botts L.L.P.

(57) ABSTRACT

In one embodiment, a method includes receiving an indication of a first location of a first user from a mobile-client system of a first user, generating one or more search queries based on the location of the first user, executing one or more of the search queries, and sending a plurality of search results corresponding to the executed search queries to the mobile-client system.

20 Claims, 5 Drawing Sheets

(56) References Cited

U.S. PATENT DOCUMENTS

| | | | |
|---|---|---|---|
| 7,676,460 B2* | 3/2010 | Morgan | G06F 17/271 707/999.004 |
| 7,752,326 B2 | 7/2010 | Smit | |
| 7,783,630 B1 | 8/2010 | Chevalier | |
| 7,797,635 B1 | 9/2010 | Denise | |
| 7,836,044 B2 | 11/2010 | Kamvar | |
| 8,027,990 B1 | 9/2011 | Mysen | |
| 8,055,673 B2 | 11/2011 | Churchill | |
| 8,060,639 B2 | 11/2011 | Smit | |
| 8,082,278 B2 | 12/2011 | Agrawal | |
| 8,112,529 B2 | 2/2012 | Van Den Oord | |
| 8,135,721 B2 | 3/2012 | Joshi | |
| 8,145,636 B1 | 3/2012 | Jeh | |
| 8,180,804 B1 | 5/2012 | Narayanan | |
| 8,185,558 B1 | 5/2012 | Narayanan | |
| 8,209,330 B1 | 6/2012 | Covell | |
| 8,239,364 B2 | 8/2012 | Wable | |
| 8,244,848 B1 | 8/2012 | Narayanan | |
| 8,271,471 B1 | 9/2012 | Kamvar | |
| 8,271,546 B2 | 9/2012 | Gibbs | |
| 8,301,639 B1* | 10/2012 | Myllymaki | G06F 17/3097 707/748 |
| 8,306,922 B1 | 11/2012 | Kunal | |
| 8,312,056 B1 | 11/2012 | Peng | |
| 8,321,364 B1 | 11/2012 | Gharpure | |
| 8,364,709 B1 | 1/2013 | Das | |
| 8,386,465 B2 | 2/2013 | Ansari | |
| 8,407,200 B2 | 3/2013 | Wable | |
| 8,412,749 B2 | 4/2013 | Fortuna | |
| 8,538,960 B2 | 9/2013 | Wong | |
| 8,572,129 B1 | 10/2013 | Lee | |
| 8,578,274 B2 | 11/2013 | Druzgalski | |
| 8,595,297 B2 | 11/2013 | Marcucci | |
| 8,601,027 B2 | 12/2013 | Behforooz | |
| 8,606,721 B1 | 12/2013 | Dicker | |
| 8,639,725 B1 | 1/2014 | Udeshi | |
| 8,645,366 B1* | 2/2014 | Acharya | G06F 17/3087 707/723 |
| 8,700,540 B1* | 4/2014 | Zambrano | G06Q 50/01 705/319 |
| 8,732,208 B2 | 5/2014 | Lee | |
| 8,751,521 B2 | 6/2014 | Lee | |
| 8,775,324 B2 | 7/2014 | Zhu | |
| 8,782,080 B2 | 7/2014 | Lee | |
| 8,782,753 B2 | 7/2014 | Lunt | |
| 8,832,111 B2 | 9/2014 | Venkataramani | |
| 8,868,590 B1 | 10/2014 | Donneau-Golencer | |
| 8,868,603 B2 | 10/2014 | Lee | |
| 8,898,226 B2 | 11/2014 | Tiu | |
| 8,909,637 B2 | 12/2014 | Patterson | |
| 8,914,392 B2 | 12/2014 | Lunt | |
| 8,918,418 B2 | 12/2014 | Lee | |
| 8,924,406 B2 | 12/2014 | Lunt | |
| 8,935,255 B2 | 1/2015 | Sankar | |
| 8,935,261 B2 | 1/2015 | Pipegrass | |
| 8,935,271 B2 | 1/2015 | Lassen | |
| 8,949,232 B2 | 2/2015 | Harrington | |
| 8,949,250 B1 | 2/2015 | Garg | |
| 8,949,261 B2 | 2/2015 | Lunt | |
| 8,954,675 B2 | 2/2015 | Venkataramani | |
| 8,983,991 B2 | 3/2015 | Sankar | |
| 9,098,569 B1* | 8/2015 | Bhagat | G06F 17/30646 |
| 9,219,668 B2 | 12/2015 | Johnson | |
| 9,319,473 B2 | 4/2016 | Zadorozny | |
| 2002/0059199 A1 | 5/2002 | Harvey | |
| 2002/0086676 A1 | 7/2002 | Hendrey | |
| 2002/0196273 A1 | 12/2002 | Krause | |
| 2003/0154194 A1 | 8/2003 | Jonas | |
| 2003/0208474 A1 | 11/2003 | Soulanille | |
| 2004/0088325 A1 | 5/2004 | Elder | |
| 2004/0172237 A1 | 9/2004 | Saldanha | |
| 2004/0215793 A1 | 10/2004 | Ryan | |
| 2004/0243568 A1 | 12/2004 | Wang | |
| 2004/0255237 A1 | 12/2004 | Tong | |
| 2005/0091202 A1 | 4/2005 | Thomas | |
| 2005/0125408 A1 | 6/2005 | Somaroo | |
| 2005/0131872 A1 | 6/2005 | Calbucci | |
| 2005/0171955 A1 | 8/2005 | Hull | |
| 2005/0256756 A1 | 11/2005 | Lam | |
| 2006/0041597 A1 | 2/2006 | Conrad | |
| 2006/0117378 A1 | 6/2006 | Tam | |
| 2006/0136419 A1 | 6/2006 | Brydon | |
| 2006/0190436 A1 | 8/2006 | Richardson | |
| 2006/0200432 A1* | 9/2006 | Flinn | G06N 5/048 706/12 |
| 2006/0200433 A1* | 9/2006 | Flinn | G06N 99/005 706/12 |
| 2007/0174304 A1 | 7/2007 | Shrufi | |
| 2007/0203872 A1* | 8/2007 | Flinn | G06N 5/048 706/62 |
| 2007/0277100 A1 | 11/2007 | Sheha | |
| 2008/0005064 A1 | 1/2008 | Sarukkai | |
| 2008/0033926 A1 | 2/2008 | Matthews | |
| 2008/0045236 A1* | 2/2008 | Nahon | H04W 4/12 455/456.1 |
| 2008/0072180 A1 | 3/2008 | Chevalier | |
| 2008/0114730 A1 | 5/2008 | Larimore | |
| 2008/0183694 A1 | 7/2008 | Cane | |
| 2008/0183695 A1 | 7/2008 | Jadhav | |
| 2008/0270615 A1 | 10/2008 | Centola | |
| 2008/0288354 A1* | 11/2008 | Flinn | G06N 99/005 705/14.53 |
| 2009/0005021 A1* | 1/2009 | Forstall | H04M 1/72572 455/414.3 |
| 2009/0006543 A1 | 1/2009 | Smit | |
| 2009/0054043 A1 | 2/2009 | Hamilton | |
| 2009/0083232 A1* | 3/2009 | Ives | G06F 17/3064 |
| 2009/0094200 A1 | 4/2009 | Baeza-Yates | |
| 2009/0144075 A1* | 6/2009 | Flinn | G06N 5/048 705/318 |
| 2009/0157513 A1 | 6/2009 | Bonev | |
| 2009/0164408 A1 | 6/2009 | Grigorik | |
| 2009/0164431 A1 | 6/2009 | Zivkovic | |
| 2009/0164929 A1 | 6/2009 | Chen | |
| 2009/0197681 A1 | 8/2009 | Krishnamoorthy | |
| 2009/0228296 A1 | 9/2009 | Ismalon | |
| 2009/0259624 A1 | 10/2009 | DeMaris | |
| 2009/0259646 A1 | 10/2009 | Fujita | |
| 2009/0265326 A1 | 10/2009 | Lehrman | |
| 2009/0271370 A1 | 10/2009 | Jagadish | |
| 2009/0276230 A1* | 11/2009 | Smyers | G06Q 30/00 705/1.1 |
| 2009/0276414 A1 | 11/2009 | Gao | |
| 2009/0281988 A1 | 11/2009 | Yoo | |
| 2009/0299963 A1 | 12/2009 | Pippori | |
| 2010/0004004 A1* | 1/2010 | Browne-Swinburne | H04W 4/02 455/457 |
| 2010/0023495 A1* | 1/2010 | Gupta | G06F 17/30867 707/E17.018 |
| 2010/0049802 A1 | 2/2010 | Raman | |
| 2010/0057723 A1 | 3/2010 | Rajaram | |
| 2010/0082604 A1* | 4/2010 | Gutt | G06F 17/30648 707/721 |
| 2010/0082695 A1 | 4/2010 | Hardt | |
| 2010/0125562 A1 | 5/2010 | Nair | |
| 2010/0145771 A1 | 6/2010 | Fligler | |
| 2010/0179929 A1 | 7/2010 | Yin | |
| 2010/0197318 A1 | 8/2010 | Petersen | |
| 2010/0228744 A1 | 9/2010 | Craswell | |
| 2010/0235354 A1 | 9/2010 | Gargaro | |
| 2010/0312724 A1* | 12/2010 | Pinckney | G06N 99/005 706/11 |
| 2010/0321399 A1 | 12/2010 | Ellren | |
| 2011/0004609 A1 | 1/2011 | Chitiveli | |
| 2011/0022602 A1 | 1/2011 | Luo | |
| 2011/0078166 A1 | 3/2011 | Oliver | |
| 2011/0087534 A1 | 4/2011 | Strebinger | |
| 2011/0137902 A1 | 6/2011 | Wable | |
| 2011/0184981 A1 | 7/2011 | Lu | |
| 2011/0191371 A1 | 8/2011 | Elliott | |
| 2011/0196855 A1 | 8/2011 | Wable | |
| 2011/0231296 A1 | 9/2011 | Gross | |

(56) References Cited

U.S. PATENT DOCUMENTS

| | | |
|---|---|---|
| 2011/0276396 A1 | 11/2011 | Rathod |
| 2011/0291863 A1* | 12/2011 | Ozaki ................ G01C 21/3682 340/995.14 |
| 2011/0307478 A1* | 12/2011 | Pinckney ............. G06N 99/005 707/724 |
| 2011/0313992 A1 | 12/2011 | Groeneveld |
| 2011/0320470 A1 | 12/2011 | Williams |
| 2012/0042020 A1 | 2/2012 | Kolari |
| 2012/0047147 A1 | 2/2012 | Redstone |
| 2012/0059708 A1 | 3/2012 | Galas |
| 2012/0110080 A1 | 5/2012 | Panyam |
| 2012/0136852 A1 | 5/2012 | Geller |
| 2012/0136855 A1* | 5/2012 | Ni ...................... G06F 17/30867 707/724 |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0258738 A1 | 10/2012 | Lee |
| 2012/0271831 A1 | 10/2012 | Narayanan |
| 2012/0272156 A1* | 10/2012 | Kerger .................. H04M 3/487 715/747 |
| 2012/0278127 A1 | 11/2012 | Kirakosyan |
| 2012/0278385 A1* | 11/2012 | Papakipos .............. G06Q 50/30 709/204 |
| 2012/0278475 A1* | 11/2012 | Papakipos .............. G06Q 10/10 709/224 |
| 2012/0278641 A1* | 11/2012 | Papakipos ............... H04L 69/04 713/323 |
| 2012/0284329 A1 | 11/2012 | Van Den Oord |
| 2012/0290562 A1* | 11/2012 | Wable ............... G06F 17/30867 707/722 |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0054631 A1* | 2/2013 | Govani ............... G06F 16/9535 707/767 |
| 2013/0066876 A1 | 3/2013 | Raskino |
| 2013/0073400 A1* | 3/2013 | Heath ................... G06Q 30/02 705/14.73 |
| 2013/0073422 A1 | 3/2013 | Moore |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0117122 A1* | 5/2013 | Cooper ............... G06Q 30/0261 705/14.58 |
| 2013/0124490 A1* | 5/2013 | Naranjo ............. G06F 17/3097 707/706 |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0238432 A1* | 9/2013 | Bai .................. G06F 17/30867 705/14.52 |
| 2013/0246404 A1 | 9/2013 | Annau |
| 2013/0254155 A1 | 9/2013 | Thollot |
| 2013/0254213 A1* | 9/2013 | Cheng .................... G06Q 50/01 707/748 |
| 2013/0254305 A1 | 9/2013 | Cheng |
| 2013/0282682 A1* | 10/2013 | Batraski ........... G06F 17/30864 707/706 |
| 2013/0282709 A1* | 10/2013 | Zhu ..................... G06F 17/3064 707/728 |
| 2014/0006416 A1 | 1/2014 | Leslie |
| 2014/0067535 A1 | 3/2014 | Rezaei |
| 2014/0122465 A1 | 5/2014 | Bilinski |
| 2014/0141808 A1 | 5/2014 | Deng |
| 2014/0143351 A1 | 5/2014 | Deng |
| 2014/0188935 A1* | 7/2014 | Vee ..................... G06F 17/3043 707/771 |
| 2014/0280080 A1 | 9/2014 | Solheim |
| 2014/0304429 A1 | 10/2014 | Softky |
| 2015/0074289 A1 | 3/2015 | Hyman |
| 2015/0161519 A1 | 6/2015 | Zhong |
| 2015/0286643 A1 | 10/2015 | Kumar |
| 2015/0363402 A1 | 12/2015 | Jackson |
| 2016/0026727 A1 | 1/2016 | Bar-Yossef |
| 2016/0041982 A1 | 2/2016 | He |
| 2016/0042067 A1 | 2/2016 | Weng |
| 2016/0063093 A1 | 3/2016 | Boucher |
| 2016/0063115 A1 | 3/2016 | Ayan |
| 2016/0162502 A1 | 6/2016 | Zhou |
| 2016/0203238 A1 | 7/2016 | Cherniavskii |

FOREIGN PATENT DOCUMENTS

| | | |
|---|---|---|
| WO | WO 2012/087470 A1 | 6/2012 |
| WO | WO 2012/121950 A1 | 9/2012 |
| WO | WO 2012/122362 A2 | 9/2012 |
| WO | WO 2013/019688 | 2/2013 |

OTHER PUBLICATIONS

U.S. Appl. No. 13/490,394, filed Jun. 6, 2012, Vaccari.

International Search Report and Written Opinion for International Application PCT/US2014/017885, dated Jul. 30, 2014.

IP Australia Examination Report No. 1 for Standard Patent Application for AU Patent Application No. 2016201243, dated Dec. 9, 2016.

Canadian Intellectual Property Office, Office Action for Application No. 2,915,607, dated Feb. 6, 2017.

Examination Report No. 1 for AU Application No. 2017203859, dated Jun. 5, 2018.

Notification of Reasons for Rejection for JP Application No. 2016-041140 (with English translation), dated Apr. 24, 2018.

IL Office Action received for Patent Application No. 243972. (with English Translation), dated Jul. 18, 2018.

AU Office Action received for Patent Application No. 2017203859, dated Sep. 25, 2018.

\* cited by examiner

PUSHING SUGGESTED SEARCH QUERIES TO MOBILE DEVICES

PRIORITY

This application is a continuation under 35 U.S.C. § 120 of U.S. patent application Ser. No. 13/776,469, filed 25 Feb. 2013.

TECHNICAL FIELD

This disclosure generally relates to mobile devices, social graphs, and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a Global Positioning System (GPS) receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, the social-networking system may push one or more suggested search queries to a mobile device of a user of an online social network. The social-networking system may determine an intent of the user based on the user's location (or the location of the user's mobile device) and possibly based on other available data, such as the time of day, the proximity of the user to other users or objects, social-graph information, social-graph affinity, the search history of the user, feedback from the user, or other relevant information about the user. Based on the determined intent of the user, the social-networking system may then generate one or more suggested queries for the user. The social-networking system may then transmit a notification to the mobile device of the user that includes one or more of the generated suggested queries.

DESCRIPTION OF EXAMPLE EMBODIMENTS

Figure 1:
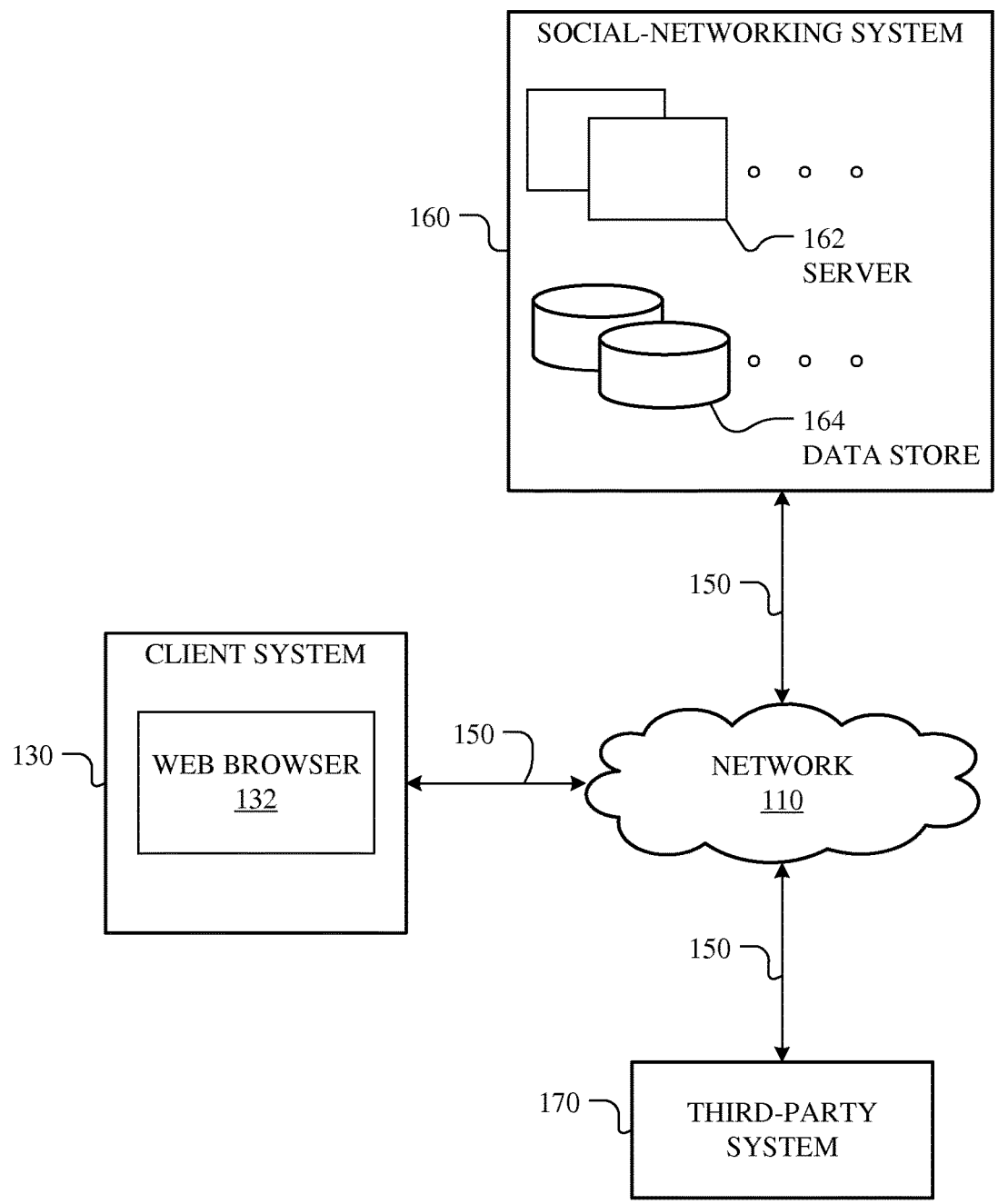
FIG. 1 illustrates an example network environment associated with a social-networking system.

FIG. 1 illustrates an example network environment 100 associated with a social-networking system. Network environment 100 includes a mobile-client system 130, a social-networking system 160, and a search-engine system 170 connected to each other by a network 110. Although FIG. 1 illustrates a particular arrangement of mobile-client system 130, social-networking system 160, search-engine system 170, and network 110, this disclosure contemplates any suitable arrangement of mobile-client system 130, social-networking system 160, search-engine system 170, and network 110. As an example and not by way of limitation, two or more of mobile-client system 130, social-networking system 160, and search-engine system 170 may be connected to each other directly, bypassing network 110. As another example, two or more of mobile-client system 130, social-networking system 160, and search-engine system 170 may be physically or logically co-located with each other in whole or in part. Moreover, although FIG. 1 illustrates a particular number of mobile-client systems 130, social-networking systems 160, search-engine systems 170, and networks 110, this disclosure contemplates any suitable number of mobile-client systems 130, social-networking systems 160, search-engine systems 170, and networks 110. As an example and not by way of limitation, network environment 100 may include multiple mobile-client system 130, social-networking systems 160, search-engine systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect mobile-client system 130, social-networking system 160, and search-engine system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, mobile-client system 130 may be an electronic device including hardware, software, or embedded logic components or a combination of two or more such components and capable of carrying out the appropriate functionalities implemented or supported by mobile-client system 130. Mobile-client system 130 may be any suitable mobile computing device, such as, for example, a laptop computer, a cellular telephone, a smartphone, or a tablet computer. This disclosure contemplates any suitable mobile-client systems 130. A mobile-client system 130 may enable a network user at mobile-client system 130 to access network 110. In particular embodiments, one or more users 101 may use one or more mobile-client systems 130 to access, send data to, and receive data from social-networking system 160 or search-engine system 170. Mobile-client system 130 may access social-networking system 160 or search-engine system 170 directly, via network 110, or via a third-party system. As an example and not by way of limitation, mobile-client system 130 may access search-engine system 170 via social-networking system 160. A mobile-client system 130 may enable its user to communicate with other users at other client systems.

In particular embodiments, mobile-client system 130 may include a web browser, such as, for example, MICROSOFT INTERNET EXPLORER (or INTERNET EXPLORER MOBILE), GOOGLE CHROME, GOOGLE ANDROID, APPLE SAFARI, OPERA (or OPERA MINI or OPERA MOBILE), BITSTREAM BOLT, or MOZILLA FIREFOX (or FIREFOX MOBILE), and may have one or more add-ons, plug-ins, or other extensions. To request access to a webpage, a user 101 at mobile-client system 130 may enter a Uniform Resource Locator (URL) or other address directing the web browser to a particular server (such as, for example, a server associated with a social-networking system 160, a 3rd-party application server, a web server, an enterprise server, a device-detection system 170, or another suitable system), and the web browser may generate a Hyper Text Transfer Protocol (HTTP) request and communicate the HTTP request to server. The request for the webpage may include an http-header comprising one or more header fields that define the operating parameters of the HTTP transaction. The server may accept the HTTP request and communicate to mobile-client system 130 one or more Hyper Text Markup Language (HTML) files responsive to the HTTP request. Mobile-client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a mobile-client system 130, a social-networking system 160, or a search-engine system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of search-engine system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from search-engine systems 170 or other entities, or to allow users to interact with these entities through an application programming interfaces (API) or other communication channels.

In particular embodiments, search-engine system 170 may be a network-addressable computing system that can host an online search engine. Search-engine system 170 may generate, store, receive, and send search-related data, such as, for example, search queries, search results, and other suitable search-related data. As an example and not by way of limitation, search-engine system 170 may implement one or more search algorithms to identify network resources in response to search queries received at search-engine system 170, one or more scoring algorithms or ranking algorithms to score and/or rank identified network resources, or one or more summarization algorithms to summarize identified network resources. In particular embodiments, a scoring algorithm implemented by search-engine system 170 may use a machine-learned scoring formula, which the scoring algorithm may obtain automatically from a set of training data constructed from pairs of search queries and selected Uniform Resource Locators (URLs), where appropriate. Search-engine system 170 may be accessed by the other components of network environment 100 either directly or via network 110.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a mobile-client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more mobile-client systems 130 or one or more search-engine system 170 via network 110. The web server may include a mail server or other messaging functionality for receiving and routing messages between social-networking system 160 and one or more mobile-client systems 130. An API-request server may allow a search-engine system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a mobile-client system 130. Information may be pushed to a mobile-client system 130 as notifications, or information may be pulled from mobile-client system 130 responsive to a request received from mobile-client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., search-engine system 170), such as, for example, by setting appropriate privacy settings. Third-party-content-object stores may be used to store content objects received from third parties, such as a search-engine system 170. Location stores may be used for storing location information received from mobile-client systems 130 associated with users. Ad-pricing modules may combine social information, the current time, location information, or other suitable information to provide relevant advertisements, in the form of notifications, to a user.

Figure 2:
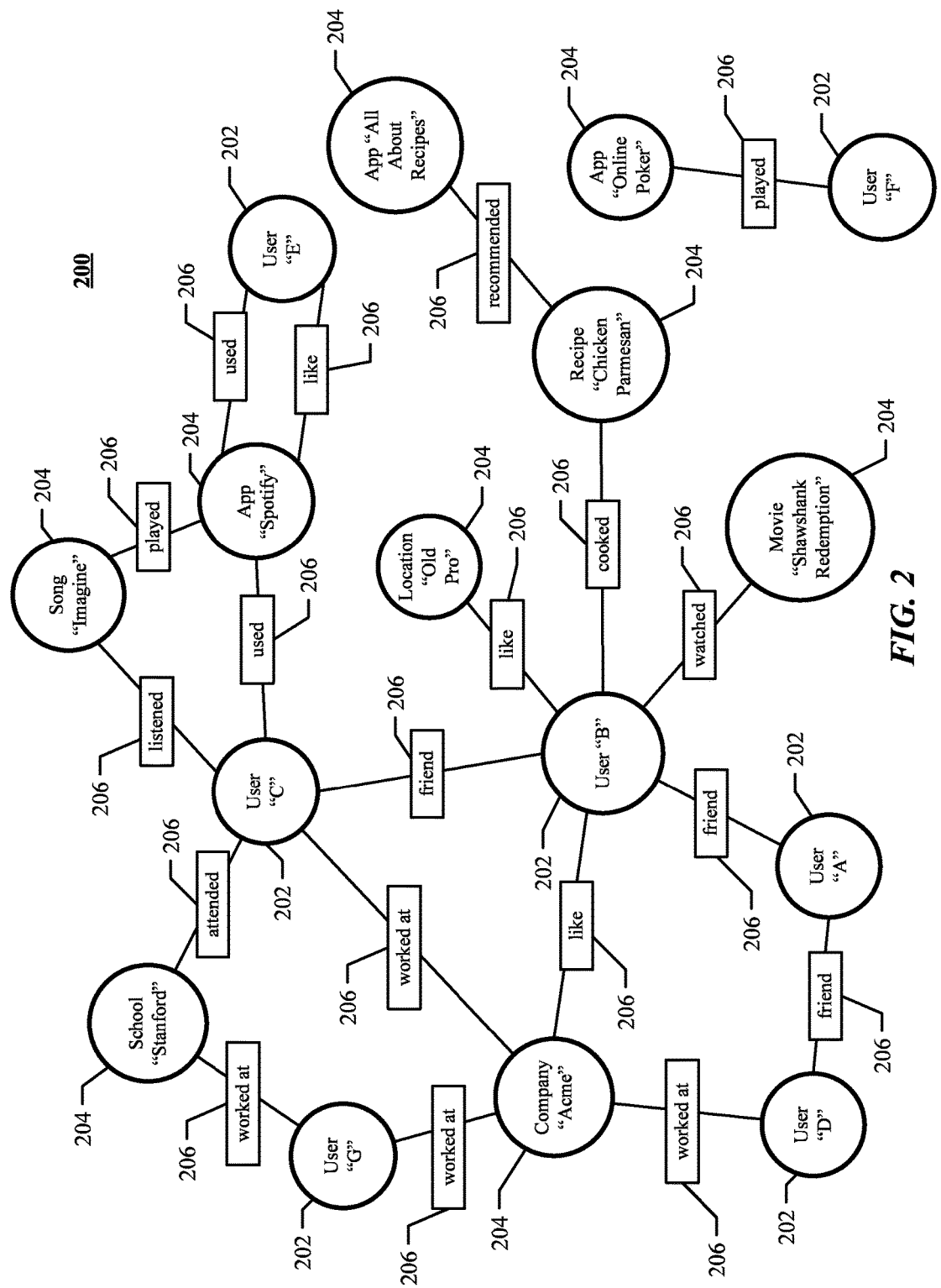
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, mobile-client system 130, or search-engine system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a search-engine system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a mobile-client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's mobile-client system 130) may indicate that he or she likes the concept represented by the concept node 204 by clicking or selecting a "Like" icon, which may cause the user's mobile-client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user). In addition or as an alternative, an advertisement may be one or more sponsored stories (e.g. a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes by, for example, having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content. As another example and not by way of limitation, advertisements may be included among suggested search query, where suggested queries that reference the advertiser or its content/products may be promoted over non-sponsored queries.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g. through social-networking system 160) or RSVP (e.g. through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

In particular embodiments, the social-networking system 160 may determine a geographic location (hereinafter also simply "location") of an object (e.g., a user, a concept, or a mobile-client system 130 associated with a user or concept). The location of an object may be identified and stored as a street address (e.g., "1601 Willow Road"), a set of geographic coordinates (latitude and longitude), a reference to another location or object (e.g., "the coffee shop next to the train station"), a reference to a map tile (e.g., "map tile 32"), or using another suitable identifier. In particular embodiments, the location of an object may be provided by a user of an online social network. As an example and not by way of limitation, a user may input his location by checking-in at the location or otherwise providing an indication of his location. As another example and not by way of limitation, a user may input the location of a concept (e.g., a place or venue) by accessing the profile page for the concept and entering the location information (e.g., the stress address) of the concept. In particular embodiment, the location of a mobile-client system 130 equipped with cellular, Wi-Fi, GPS, or other suitable capabilities may be identified with geographic-positioning signals. As an example and not by way of limitation, a mobile-client system 130 may include one or more sensors that may facilitate geo-location functionalities of the system. Processing of sensor inputs by the mobile-client system 130 with one or more sensor devices (for example, processing a GPS sensor signal and displaying in the device's graphical user interface a map of a location corresponding to the GPS sensor signal) may be implemented by a combination of hardware, software, and/or firmware (or device drivers). Geographic-positioning signals may be obtained by cell tower triangulation, Wi-Fi positioning, or GPS positioning. In particular embodiments, a geographic location of an Internet-connected computer can be identified by the computer's IP address. A mobile-client system 130 may also have additional functionalities incorporating geographic-location data of the device, such as, for example, providing driving directions, displaying a map of a current location, or providing information of nearby points of interest such as restaurants, gas stations, etc. As an example and not by way of limitation, a web browser application on the mobile-client system 130 may access a mapping library (e.g., via a function call) that generates a map containing a GPS location obtained by a device driver interpreting a GPS signal from a GPS sensor, and display the map in the web browser application's graphical user interface. In particular embodiments, the location of a user may be determined from a search history associated with the user. As an example and not by way of limitation, if a particular user has previously queried for objects in a particular location, the social-networking system 160 (or the search-engine system 170) may assume that the user is still at that particular location. Although this disclosure describes determining the location of an object in a particular manner, this disclosure contemplates determining the location of an object in any suitable manner.

In particular embodiments, the social-networking system 160 may maintain a database of information relating to locations. The social-networking system 160 may also maintain meta information about particular locations, such as, for example, photos of the location, advertisements, user reviews, comments, "check-in" activity data, "like" activity data, hours of operation, or other suitable information related to the location. In particular embodiments, a location may correspond to a concept node 204 in a social graph 200 (such as, for example, as described previously or as described in U.S. patent application Ser. No. 12/763,171, which is incorporated by reference herein). The social-networking system 160 may allow users to access information regarding a location using a client application (e.g., a web browser or other suitable application) hosted by a mobile-client system 130. As an example and not by way of limitation, social-networking system 160 may serve webpages (or other structured documents) to users that request information about a location. In addition to user profile and location information, the system may track or maintain other information about the user. As an example and not by way of limitation, the social-networking system 160 may support geo-social-networking functionality including one or more location-based services that record the user's location. As an example and not by way of limitation, users may access the geo-social-networking system using a special-purpose client application hosted by a mobile-client system 130 of the user (or a web- or network-based application using a browser client). The client application may automatically access GPS or other geo-location functions supported by the mobile-client system 130 and report the user's current location to the geo-social-networking system. In addition, the client application may support geo-social networking functionality that allows users to "check-in" at various locations and communicate this location to other users. A check-in to a given location may occur when a user is physically located at a location and, using a mobile-client system 130, access the geo-social-networking system to register the user's presence at the location. The social-networking system 160 may automatically check-in a user to a location based on the user's current location and past location data (such as, for example, as described in U.S. patent application Ser. No. 13/042,357, which is incorporated by reference herein). In particular embodiments, the social-networking system 160 may allow users to indicate other types of relationships with respect to particular locations, such as "like," "fan," "worked at," "recommended," "attended," or another suitable type of relationship. In particular embodiments, "check-in" information and other relationship information may be represented in the social graph 200 as an edge 206 connecting the user node 202 of the user to the concept node 204 of the location.

Figure 3:
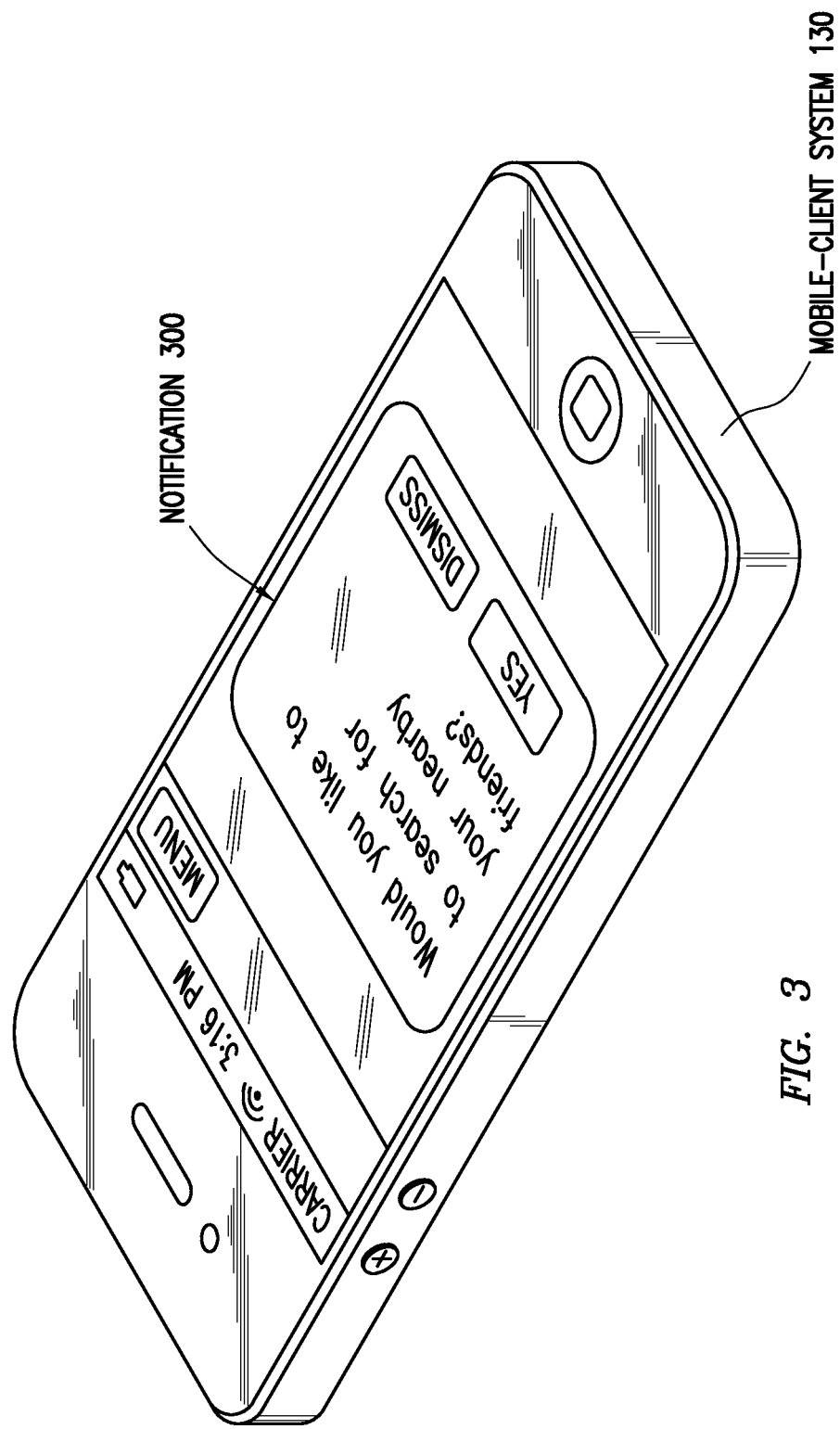
FIG. 3 illustrates an example mobile-client system with a notification containing a suggested search query.

FIG. 3 illustrates an example mobile-client system 130 with a notification 300 containing a suggested search query. In particular embodiments, the social-networking system 160 may push one or more suggested search queries to a mobile-client system 130 of a user of an online social network. Inputting queries into a mobile device, such as a mobile-client system 130, may be difficult because of the small or otherwise limited input means on such devices. This may be especially true for natural-language queries may be relatively long and complex. One way to remedy this difficulty may be to have a suggested query pushed onto the mobile device and presented to the user. In order to improve the quality of the suggested queries, the intent of the user may first be determined, and then suggested queries related to that intent may be generated and pushed to the user. The determined intents may correspond to particular queries or query-types, which may then be sent to the user as suggested queries. The social-networking system 160 may determine the intent of the user based on the user's location (or the location of the user's mobile-client system 130) and possibly based on other available data. The social-networking system 160 may determine the intent of the user based on, for example, the time of day, the proximity of the user to other users or objects, social-graph information, social-graph affinity, the search history of the user, feedback from the user, other relevant information about the user, or any combination thereof. As an example and not by way of limitation, if the user typically goes out for lunch around noon, the system may determine that the user's intent around noon is to find nearby restaurants. Based on the determined intent of the user, the social-networking system may then generate one or more suggested queries for the user. As an example and not by way of limitation, the social-networking system 160 may generate the suggested query "Do you want to search for restaurants nearby?" to the user around noon. The social-networking system may then transmit a notification 300 to the mobile-client system 130 of the user that includes one or more of the generated suggested queries. As an example and not by way of limitation, as illustrated in FIG. 3, a pop-up notification 300 may be pushed to the user's mobile-client system 130 that reads "Would you like to search for your nearby friends?", and may include a way for the user to select the suggested query to execute it (such as, for example, by clicking on a button marked "Yes"), and may also include a way for the user to dismiss the suggested query (such as, for example, by clicking on a button marked "Dismiss"). Although this disclosure describes pushing suggested queries to mobile devices in a particular manner, this disclosure contemplates pushing suggested queries to mobile devices in any suitable manner. Furthermore, although this disclosure describes particular elements of network environment 100 performing particular processes, this disclosure contemplates any suitable elements of network environment 100 performing any suitable processes. As an example and not by way of limitation, one or more of the processes described herein may be performed by a search-engine system 170, alone or in conjunction with social-networking system 160 or another suitable system. In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

In particular embodiments, the social-networking system 160 may receive an indication of a location of a mobile-client system 130. The mobile-client system 130 may be associated with a particular user of the online social network. The social-networking system 160 may determine the location of the user (or the user's mobile-client device 130) in any suitable manner, as described previously. As an example and not by way of limitation, the social-networking system may identify the location of a user based on a global position system (GPS) signal, a Wi-Fi signal, a cellular radio signal, check-in information, user-profile information, other suitable location information, or any combination thereof. Although this disclosure describes determining locations of users in a particular manner, this disclosure contemplates determining locations of users in any suitable manner.

In particular embodiments, the social-networking system 160 may determine an intent of the user based at least on the location of the mobile-client system 130 of the user. Particular intents may be associated with particular locations (e.g., work vs. home, restaurant, shops, theater, etc.). Furthermore, objects that are geographically closers to each other may be considered to be more related or of more interest to each other than more distant objects. As an example and not by way of limitation, if a user is nearby a theater, the social-networking system 160 may determine that the user's intent is to search for information related to the theater and may generate an appropriate suggested query, such as "Do you want to see movie show times for the theater?". As another example and not by way of limitation, if the user's is at a restaurant, the social-networking system 160 may determine that the user's intent is to search for information related to the restaurant and may generate an appropriate suggested query, such as "Would you like to search for reviews of the restaurant?". In particular embodiments, the social-networking system 160 may identify a location-pattern characteristic from user engagement with notifications. The location-pattern characteristic may indicate geographic locations where the user would like to search for particular objects (or has previously searches for such objects). The social-networking system 160 may identify the locations where the user more frequently runs search queries, or more frequently interacts with suggested queries provided to the user. As an example and not by way of limitation, the social-networking system 160 may identify that the user frequently searches for restaurants liked by the user's friends when the user is in or about the city of San Jose, Calif. Thus, the social-networking system 160 may determine that the user's intent when the user's current location is in or near San Jose is to search for restaurants (or possibly other objects) liked by the user's friends. As another example and not by way of limitation, the social-networking system 160 may identify that the user rarely runs searches when the user is in or about the city of Palo Alto, Calif. In this case, the social-networking system 160 may determine that the user's intent when the user's current location is in or near Palo Alto is to not search for anything (and thus suggested queries may not be pushed to the user when the user is in this location). Accordingly, the social-networking system 160 may only send relevant suggested queries when the user is located in particular locations to reflect the identified pattern. The social-networking system 160 may also adjust the rate at which suggested queries are provided when the user is located in any particular location based on the frequency with which the user interacts with suggested queries while at those locations (e.g., providing more suggested queries when the user is at a location where the user typically interacts with these queries and providing fewer suggested queries when the user is at a location where the user tends to dismiss these queries). In particular embodiments, the social-networking system 160 may determine the intent of the user further based on the proximity of the first user to one or more objects. The objects may correspond to social-graph elements, such as user nodes 202 or concept nodes 204 in social graph 200. Each object may be associated with a particular location, which may also be determined by the social-networking system 160. The social-networking system 160 may then determine the distance between the location of the user and the location of any particular object. A first user may be more interested in other users or concepts that are closer to the first user. The intent of the user may then be determined based on the proximity of these objects. As an example and not by way of limitation, if a user is one mile from an airport and two miles from a gas station, the social-networking system 160 may determine that the user's intent is more closely related to the airport than the gas station based on the proximity of the airport. Although this disclosure describes determining user intents based on location in a particular manner, this disclosure contemplates determining user intents based on location in any suitable manner.

In particular embodiments, the social-networking system 160 may determine the intent of the user based on a social-graph affinity associated with the user. The social-networking system 160 may access a social graph 200 comprising a plurality of nodes and a plurality of edges 206 connecting the nodes In particular embodiments, the social-networking system 160 may determine the social-graph affinity (hereinafter "affinity") of various social-graph entities for each other. Affinity may represent the strength of a relationship or level of interest between particular objects associated with the online social network, such as users, concepts, content, actions, advertisements, other objects associated with the online social network, or any combination thereof. Affinity may also be determined with respect to objects associated with third-party systems 170, or other suitable systems. An overall affinity for a social-graph entity for each user, subject matter, type of content, and so forth may be established. In particular embodiments, the social-networking system 160 may measure or quantify social-graph affinity using an affinity coefficient (hereinafter "coefficient"). The coefficient may represent or quantify the strength of a relationship between particular objects associated with the online social network. The coefficient may also represent a probability or function that measures a predicted probability that a user will perform a particular action based on the user's interest in the action. Coefficients may be used to determine a user's intent by determining a user's interest in particular actions or predict whether a user will perform a particular action based on the user's interest in the action. As an example and not by way of limitation, if the user has a relatively high coefficient with respect to a particular object (e.g., the location "Old Pro"), the social-networking system 160 may determine that the user is interested in searching for information relating to that object, and may generate a suggested query related to that object (e.g., a suggested query such as "Would you like directions to the Old Pro" or "Would you like to know how many of your friends recently checked-in at the Old Pro"). In particular embodiments, the social-networking system 160 may determine the intent of the first user based on a degree of separation in the social graph 200 between the user node 202 corresponding to the first user and one or more second nodes. Social-graph entities that are closer in the social graph 200 (i.e., fewer degrees of separation) may have a higher coefficient than entities that are further apart in the social graph 200. As an example and not by way of limitation, referencing FIG. 2, user "C" is one-degree of separation from the concept node 204 for the school "Stanford" and two-degrees of separation from the concept node 204 for the location "Old Pro." In this case, the social-networking system 160 may determine that the intent of user "C" is more like related to the closer social-graph entity, i.e., the school "Stanford", and thus may generate suggested queries related to this intent (e.g., a suggest query such as "Would you like to search for nearby Stanford students?"). Although this disclosure describes determining user intents based on affinity in a particular manner, this disclosure contemplates determining user intents based on affinity in any suitable manner. In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, the social-networking system 160 may determine the intent of the user based on a search history associated with the user. Suggested queries that are the same as or similar to queries that the user has previously queried may be more likely to match the intent of the querying user. In other words, the user may be more interested in searching for things the user has previously searched for (or are related to things the user has previously searched for). As an example and not by way of limitation, if the user has previously searched for "restaurants nearby", the social-networking system 160 may determine that the user's intent at a particular subsequent time is to search for the same thing (e.g., a suggested query matching this intent may be "Do you want to find nearby restaurants?"). Similarly, suggested queries that would generate search results corresponding to social-graph elements the querying user has previously accessed, or are relevant to the social-graph elements the querying user has previously accessed, may be more likely to match the intent of the querying user. As an example and not by way of limitation, if the querying user has previously visited the "Stanford University" profile page (corresponding to the concept node 204 for "Stanford University"), when determining the intent of the user when he is travelling near the school "Stanford University", the social-networking system 160 may determine that the user's intent is to located the school and may generate a suggested query such as "Do you want directions to Stanford University?" This suggested query may generate a search result corresponding to "Stanford University." Although this disclosure describes determining user intents based on search history in a particular manner, this disclosure contemplates determining user intents based on search history in any suitable manner.

In particular embodiments, the social-networking system 160 may determine the intent of the user based on the current time associated with the user. A particular user may have a pattern of activity during a typical day, such as, for example driving to certain locations, meeting with particular people, or searching for particular objects at certain times of the day. The social-networking system 160 may identify a time-pattern characteristic from these user activities and identify an intent associated with these activities. The time-pattern characteristic may be indicative of time periods in which the user would like to search for particular objects (or has previously searches for such objects). The time-pattern characteristic may also be indicative of time periods in which the user dismisses particular suggested queries, and thus has an intent that does not correspond to searching for anything at that time. As an example and not by way of limitation, the social-networking system 160 may identify a time pattern indicating that the user often searches for weather information provided between the hours of 7 AM and 8 AM daily and often searches for food or restaurant information between the hours of 12 PM and 1 PM daily. Thus, the social-networking system 160 may determine that the user's intent from 7 AM to 8 AM is to search for weather-related information and the user's intent from 12 PM to 1 PM is to search for food or restaurant information. The social-networking system 160 may also identify that the user does not perform searches or dismisses suggested queries provided outside of these time periods, and thus does not have an intent corresponding to any types of search queries during these other time periods. Accordingly, the social-networking system 160 may only send relevant suggested queries during these time periods to reflect the identified pattern. The social-networking system 160 may also adjust the rate at which suggested queries are provided during the identified time periods based on the frequency with which the user interacts with suggested queries during those periods (e.g., providing more suggested queries when the user interacts with these queries and providing fewer suggested queries when the user tends to dismiss these queries). In particular embodiments, the social-networking system 160 may divide a day into a series of time periods and determine the intent of the user based on the current time period. The time periods may comprise various time ranges (e.g., hour ranges) that represent different times of the day in which to provide suggested queries. As an example and not by way of limitation, the social-networking system 160 may divide a day into a plurality of time periods comprising a first time period representing working hours, a second time period representing lunch hours, a third time period representing home hours, a fourth time period representing dinner hours, and a fifth time period representing resting hours. The social-networking system 160 may then determine that the intent of the user during the second and fourth time period is to search for food or restaurants, while the intent of the user during the third time period may be to search for entertainment or friends. During the fifth time period, the social-networking system 160 may determine the user has no intent to search for anything since the user is resting. The time periods determined by the social-networking system 160 may be similarly applied to all the days of the week. Alternatively, different time periods may be determined by the social-networking system 160 for given days of the week. As an example and not by way of limitation, the time periods assigned for weekdays may differ from the time periods assigned for weekends. Weekdays, for example, may have a time period representing working hours, while weekends may not have such a time period. In particular embodiments, the social-networking system 160 may determine the user's intent based on the user's schedule. The social-networking system 160 access the user's calendar or otherwise determine the user's activities (e.g., in a meeting, making a phone call, eating lunch or dinner, watching a movie, etc.). The social-networking system 160 may then determine that particular intents are associated with particular activities. As an example and not by way of limitation, if the user is watching a movie, the social-networking system 160 may determine the user's intent is to search for information related to the movie and may provide a suggested query such as "Do you want to search for the cast of this movie?" Although this disclosure describes determining user intents based on time in a particular manner, this disclosure contemplates determining user intents based on time in any suitable manner.

In particular embodiments, the social-networking system 160 may determine the intent of the user based on feedback from the user. User feedback from the user may comprise data indicating an interest of the user in particular queries or query-types. As an example and not by way of limitation, user feedback may include data indicating suggested queries that the user has run and data indicating suggested queries that the user has ignored or dismissed. The social-networking system 160 may then determine that the user's intent is more likely to be to run queries that are the same as or similar to the suggested queries that the user has previously run. Similarly, the social-networking system 160 may determine that the user's intent is not likely to be match the suggested queries that the user has previously ignored or dismissed. As another example and not by way of limitation, user feedback may include user-settings data, where the user has inputted particular queries or query-types the user is interested in seeing. The social-networking system 160 may then determine that the user's intent matches the queries and query-types indicated by the user in the user-settings data and provide suggested queries that are the same as or similar to the queries and query-types indicated by the user. In particular embodiments, the social-networking system 160 may determine the intent of the user based on how the user has engaged with prior notifications sent to the user. The social-networking system 160 may identify patterns of user engagement with particular queries or query types. Based on the identified patterns, the social-networking system 160 may determine if and when the user is interested in searching for something, and the objects or types of objects the user may intend to search for. As an example and not by way of limitation, if the user has previously dismissed a suggested query such as "Would you like to search for your nearby friends?", then the social-networking system 160 may determine that the user is not interested in seeing this particular suggested query or related types of queries. As another example and not by way of limitation, if the user has previously run a suggested query such as "Would you like to search for books liked by your friends?", then the social-networking system 160 may determine that the user is interested in seeing this particular suggested query or related types of queries (and may in the future push such suggested queries to the user). Although this disclosure describes determining user intents based on user feedback in a particular manner, this disclosure contemplates determining user intents based on user feedback in any suitable manner.

In particular embodiments, the social-networking system 160 may generate one or more suggested queries based on the intent of the user. The determined intents may correspond to particular queries or query-types. Depending on the determined intent of the user, a suitable suggested query may be generated. As an example and not by way of limitation, if the user's intent indicates the user is interested in cocktails, the social-networking system 160 may generate a suggested query such as "Do you want to search for bars nearby that are liked by your friends?". In particular embodiments, the suggested queries may be based on natural-language strings generated by a context-free grammar model. Each grammar of the grammar model may comprise one or more non-terminal tokens (or "non-terminal symbols") and one or more terminal tokens (or "terminal symbols"/"query tokens"), where particular non-terminal tokens may be replaced by terminal tokens. A grammar model is a set of formation rules for strings in a formal language. In this way, the suggested queries may be rendered in a natural-language syntax with references to the relevant social-graph elements. As an example and not by way of limitation, if the social-networking system 160 has determined based on the user's intent that the user might like to search for nearby restaurants liked by the user's friends, the social-networking system 160 may generate the query command "intersect (nearby(restaurant), liked-by(friends(me)))", which could then be rendered by the social-networking system as a natural-language query, such as "nearby restaurants liked by my friends". Although this disclosure describes generating particular suggested queries in a particular manner, this disclosure contemplates generating any suitable suggested queries in any suitable manner.

In particular embodiments, the suggested queries generated by the social-networking system 160 may be structured queries comprising references to one or more social-graph elements. A structured query may include references to one or more of the identified nodes or one or more of the identified edges 206. As used herein, a structured query refers to a query that contains references to particular social-graph elements, allowing the search engine to search based on the identified elements. This type of structured query may allow the social-networking system 160 to more efficiently search for resources and content related to the online social network (such as, for example, profile pages) by searching for content connected to or otherwise related to the identified user nodes 202 and the identified edges 206. As an example and not by way of limitation, the social-networking system 160 may generate a structured query "Do you want to search for friends of Stephanie?," where "friends" and "Stephanie" in the structured query are references corresponding to particular social-graph elements. The reference to "Stephanie" would correspond to a particular user node 202, while the reference to "friends" would correspond to friend-type edges 206 connecting that user node 202 to other user nodes 202 (i.e., edges 206 connecting to "Stephanie's" first-degree friends). Although this disclosure describes generating structured queries in a particular manner, this disclosure contemplates generating structured queries in any suitable manner. More information on generating structured queries and grammar models may be found in U.S. patent application Ser. No. 13/674,695, filed 12 Nov. 2012, and U.S. patent application Ser. No. 13/731,866, filed 31 Dec. 2012, each of which is incorporated by reference.

In particular embodiments, the social-networking system 160 may calculate a score for each of the generated suggested queries. The suggested queries may scored, for example, based on the probability or likelihood that the particular suggested query matches the intent of the querying user, or based on the relevance of the particular suggested query to the intent of the querying user. If the suggested query is considered to match well or to be highly relevant to the user's determined intent, then the social-networking system 160 may calculate a relatively high score for the query. Similarly, if the suggested query does not closely match or is not particularly relevant to the user's determined intent, then the social-networking system 160 may calculate a relatively low score for the query. In particular embodiments, the score for a particular suggested query with respect to a user may be determined based on various factors, such as, for example: a location factor, which compares the location of the objects targeted by the query and the current location of the user; an interest factor, which indicates whether the objects targets by the query are relevant to the user's intent; a time factor, which determines whether the current time is within the an appropriate time period during which the user is interested in receiving suggested queries; a connection factor, which indicates the number of the user's social connections that are associated with objects targeted by the suggested query; other suitable factors, or any combination thereof. These different factors may be combined to determine an overall score. In particular embodiments, the social-networking system 160 may calculate a score for each of the generated suggested queries based on a number of possible search results corresponding to the suggested query. Suggested queries that generate more search results may be more may be more relevant to the user. However, search queries that generate too many or too few results may not be helpful. Thus, the social-networking system 160 may score suggested queries more highly if they generate more search results, but the score may be lowered of the search query generates too many results. In particular embodiments, the social-networking system 160 may score the structured queries based on advertising sponsorship. An advertiser (such as, for example, the user or administrator of a particular profile page corresponding to a particular node) may sponsor a particular node such that a suggested query that would identify that node as a search result may be scored more highly. In particular embodiments, the social-networking system 160 may rank the generated suggested queries based on the calculated scores. Although this disclosure describes scoring suggested queries in a particular manner, this disclosure contemplates scoring suggested queries in any suitable manner.

In particular embodiments, the social-networking system 160 may transmit a notification to the mobile-client system 130 of the user that comprises one or more of the suggested queries. The notification may be, for example, a SMS message, a MMS message, an email message, a banner notification, a pop-up notification, an in-app notification (e.g., a jewel notification), a cloud-to-device notification (e.g., C2DM notification), another suitable type of notification, or any combination thereof. The notification may be presented to the user, such that the user can view and interact with the transmitted suggested queries. As an example and not by way of limitation, if the social-networking system 160 determines that the user's intent is to search for a particular object, the social-networking system 160 may send a SMS message containing the suggested query and a hyperlink that the user can select to run the search. In particular embodiments, the notification may be a push notification. Push technology may be used in a variety of circumstances. For example, in a client-server environment, a server may push communications to a client. A notification may be transmitted (pushed) from the server to the client through a push channel. The client may be any type of electronic device capable of network communications. In particular embodiments, the client may be a mobile device (e.g., a mobile telephone, a smart phone, a tablet computer, etc.) capable of wireless communications, and the server may push communications, sent over a mobile network or a wireless network, to the mobile device. As an example and not by way of limitation, the social-networking system 160 may initiate a communication transaction with a user's mobile-client system 130 and transmits the notification to the mobile-client system 130 without obtaining a permission from the receiving system first. In other words, the notification may be "pushed" to the receiving device whether or not the receiving device (or the user of the device) actually wants to receive the communication. In particular embodiments, the social-networking system 160 may transmit only suggested queries having a score greater then a threshold score. As an example and not by way of limitation, only the top-scored query may be pushed to the user and displayed in a notification on the user's mobile-client system 130. In this way, only the suggested query that most closely matches the user's intent may be sent to the user. Although this disclosure describes transmitting particular notifications in a particular manner, this disclosure contemplates transmitting any suitable notifications in any suitable manner.

In particular embodiments, the social-networking system 160 may receive from the user a selection of one of the suggested queries. One or more suggested queries may be transmitted and presented to the user as a notification, as described previously. The user may then select a suggested query, indicating that it should be run by the social-networking system 160 (or the search-engine system 170, as appropriate). Alternatively, the user may dismiss or ignore the suggested query. As an example and not by way of limitation, if the suggested query is presented to the user as a pop-up notification, the notification may allow the user to select (e.g., click on) an option indicating the suggested query should be executed. The notification may also allow the user to select an option to dismiss the pop-up notification, thereby dismissing the suggested query. Alternatively, the user may just ignore the pop-up notification, which may eventually go away. In particular embodiments, the received query may be passed on to a search-engine system 170, which may execute the search query and identify appropriate search results. Although this disclosure describes receiving query selections a particular manner, this disclosure contemplates receiving query selections in any suitable manner.

In particular embodiments, the search-engine system 170 (or the social-networking system 160, or both, as appropriate) may generate one or more search results corresponding to the suggested query selected by the user. The search-engine system 170 may conduct a search based on the suggested query using various search algorithms and generate search results that identify resources (e.g., webpages, content, or other information) that are most likely to be related to the search query. In response, the search-engine system 170 may identify one or more resources that are likely to be related to the search query, which may collectively be referred to as a "search result" identified for the search query. The search results may be presented to the user, often in the form of a list of links on search-results webpage, each link being associated with a different webpage that contains some of the identified resources or content. In particular embodiments, each link in the search results may be in the form of a Uniform Resource Locator (URL) that specifies where the corresponding webpage is located and the mechanism for retrieving it. The user may then be able to click on the URL links to view the specific resources contained in the corresponding webpages as he wishes. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are relatively more relevant to the search query or to the user may be ranked higher than the resources that are relatively less relevant to the search query or the user. In particular embodiments, the search engine may limit its search to resources and content on the online social network. However, in particular embodiments, the search engine may also search for resources on other sources, such as third-party systems, the internet or World Wide Web, or other suitable sources. When generating the search results, the search-engine system 170 may generate one or more snippets for each search result, where the snippets are contextual information about the target of the search result (i.e., contextual information about the social-graph entity, profile page, or other content corresponding to the particular search result). Although this disclosure describes generating search results in a particular manner, this disclosure contemplates generating search results in any suitable manner. More information on generating search results may be found in U.S. patent application Ser. No. 13/731,939, filed 31 Dec. 2012, which is incorporated by reference.

Figure 4:
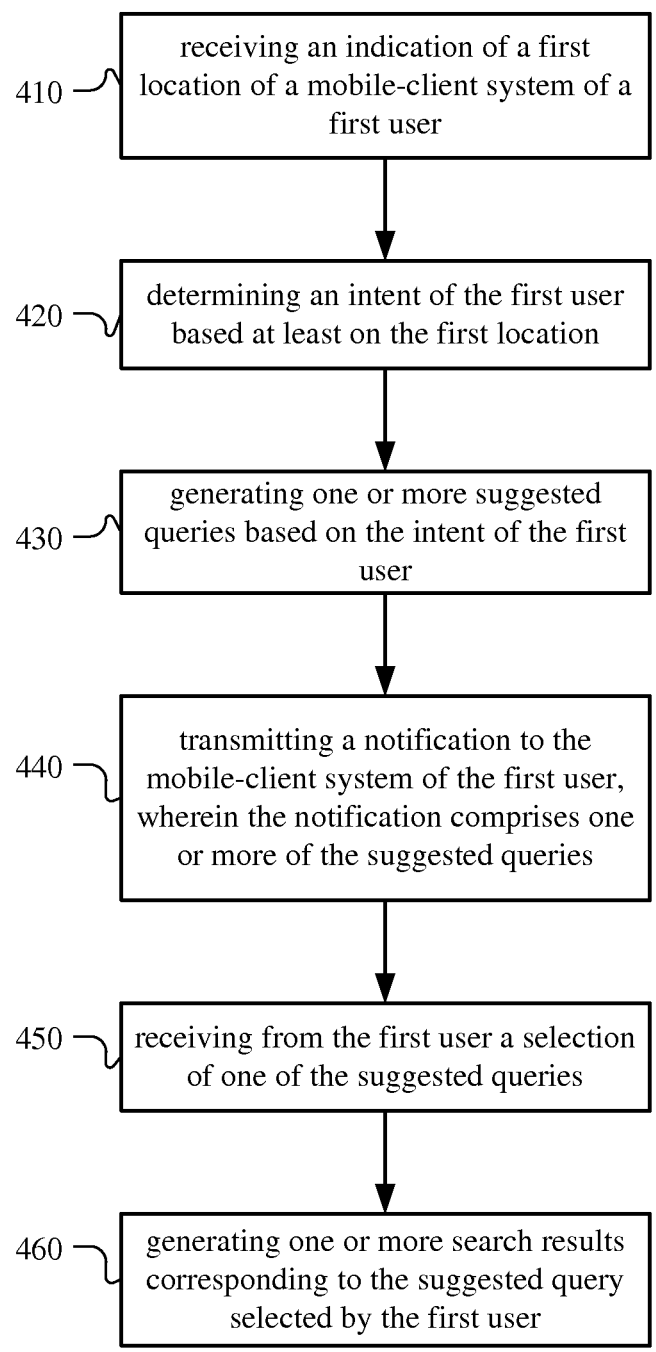
FIG. 4 illustrates an example method for pushing suggested search queries to a mobile-client system.

FIG. 4 illustrates an example method 400 for pushing suggested search queries to a mobile-client system 140. The method may begin at step 410, where the social-networking system 160 may receive an indication of a first location of a mobile-client system of a first user. At step 420, the social-networking system 160 may determine an intent of the first user based at least on the first location. The intent may also be determined based on other suitable factors. At step 430, the social-networking system 160 may generate one or more suggested queries based on the intent of the first user. The suggested queries may be structured queries comprising references to social-graph elements. The suggested queries may also be based on natural-language strings generated by a context-free grammar model. At step 440, the social-networking system 160 may transmit a notification to the mobile-client system 140 of the first user. This notification may comprise one or more of the suggested queries. At step 450, the social-networking system 160 may receive from the first user a selection of one of the suggested queries. At step 460, the social-networking system 160 may generate one or more search results corresponding to the suggested query selected by the first user. These search results may then be transmitted to the mobile-client system 140 of the first user. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Push notifications, intent, and location-based applications are further described in U.S. patent application Ser. No. 13/096,184, filed 28 Apr. 2011, U.S. patent application Ser. No. 13/096,197, filed 28 Apr. 2011, U.S. patent application Ser. No. 13/096,208, filed 28 Apr. 2011, U.S. patent application Ser. No. 13/490,394, filed 6 Jun. 2012, U.S. patent application Ser. No. 13/656,531, filed 19 Oct. 2012, U.S. patent application Ser. No. 13/681,843, filed 20 Nov. 2012, U.S. patent application Ser. No. 13/681,947, filed 20 Nov. 2012, and U.S. patent application Ser. No. 13/718,273, filed 18 Dec. 2012, each of which is incorporated by reference herein.

Figure 5:
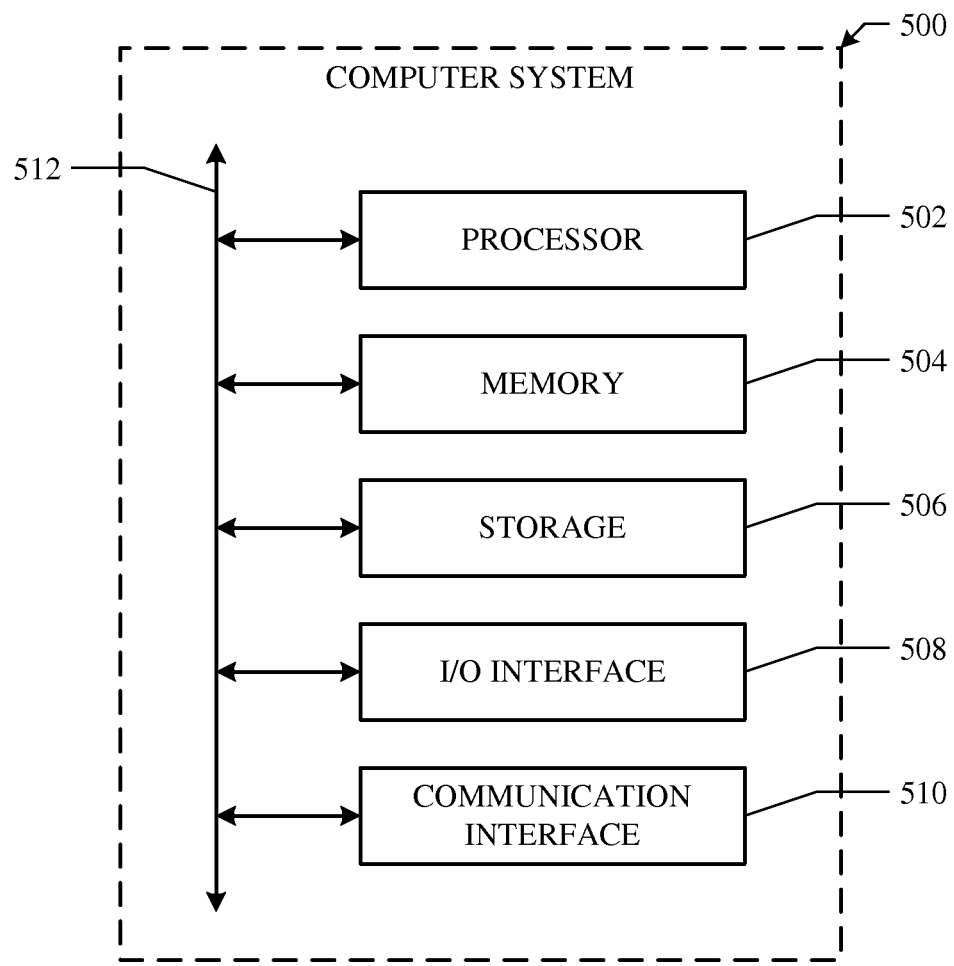
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a social-networking system of an online social network:

receiving, at the social-networking system from a mobile-client system of a first user associated with the online social network, an indication of a first location of the first user, wherein the social-networking system automatically receives periodic location data of the user transmitted by the mobile-client system;

identifying, by the social-networking system, one or more objects associated with the online social network based at least on the first location, each object having a corresponding name string;

generating, by the social-networking system, automatically in response to receiving the indication of the first location, one or more suggested queries based on the location of the first user, wherein each suggested query comprises query tokens associated with one or more of the identified objects, and wherein at least one of the query tokens of each suggested query is the name string corresponding to at least one of the identified objects;
pushing, from the social networking system to the mobile-client system automatically in response to receiving the indication of the first location, a notification comprising one or more of the suggested queries, each suggested query being selectable by the first user to retrieve search results corresponding to the suggested query;
receiving, at the social-networking system from the mobile-client system, an indication the first user has selected one of the suggested queries;
executing, by the social-networking system, the selected suggested query; and
sending, from the social networking system to the mobile-client system in response to receiving the indication of the selection, a plurality of search results corresponding to the selected suggested query, wherein each search result matches the query tokens of the selected suggested query.

2. The method of claim 1, further comprising generating one or more search results corresponding to the selected suggested query.

3. The method of claim 1, further comprising calculating a score for each of the generated suggested queries, wherein the notification comprise one or more suggested queries having a score greater than a threshold score.

4. The method of claim 3, wherein calculating the score for each of the generated suggested queries is based on a number of possible search results corresponding to the suggested query.

5. The method of claim 1, wherein the search results are sent via is one or more of a SMS message, a MMS message, an email message, a banner notification, a pop-up notification, an in-app notification, a cloud-to-device notification, or any combination thereof.

6. The method of claim 1, wherein the one or more suggested queries are based on natural-language strings generated by a context-free grammar model.

7. The method of claim 1, wherein the first location is indicated by one or more of a global position system (GPS) signal, a Wi-Fi signal, or a cellular radio signal.

8. The method of claim 1, further comprising determining an intent of the first user based at least on the first location, wherein generating the one or more suggested queries is further based on the intent of the first user.

9. The method of claim 8, wherein determining the intent of the first user is further based on one or more of:
a search history associated with the first user;
a current time associated with the first user;
feedback from the first user indicating an interest of the first user for particular queries or query-types;
a social-graph affinity associated with the first user;
the proximity of the first user to one or more objects associated with one or more second locations, the proximity of the first user being based on the distance between the first location of the first user and the second locations of the one or more objects; or
a degree of separation in a social graph between the first user and one or more objects.

10. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to the first user; and
a plurality of second nodes corresponding to a plurality of objects associated with the online social network, respectively, each second node being associated with a second location.

11. The method of claim 10, wherein the one or more suggested queries are structured queries comprising references to one or more second nodes and one or more edges.

12. The method of claim 10, wherein each search result corresponds to a node of the plurality of second nodes connected by an edge to a node corresponding to an object associated with the suggested query corresponding to the search result.

13. One or more computer-readable non-transitory storage media embodying software that is operable when executed to:
receive, at a social-networking system of an online social network from a mobile-client system of a first user associated with the online social network, an indication of a first location of the first user, wherein the social-networking system automatically receives periodic location data of the user transmitted by the mobile-client system;
identify, by the social-networking system, one or more objects associated with the online social network based at least on the first location, each object having a corresponding name string;
generate, by the social-networking system, automatically in response to receiving the indication of the first location, one or more suggested queries based on the location of the first user, wherein each suggested query comprises query tokens associated with one or more of the identified objects, and wherein at least one of the query tokens of each suggested query is the name string corresponding to at least one of the identified objects;
push, from the social-networking system, to the mobile-client system automatically in response to receiving the indication of the first location, a notification comprising one or more of the suggested queries, each suggested query being selectable by the first user to retrieve search results corresponding to the suggested query;
receive, at the social-networking system, from the mobile-client system, an indication the first user has selected one of the suggested queries;
execute, by the social-networking system, the selected suggested query; and
send, from the social-networking system, to the mobile-client system in response to receiving the indication of the selection, a plurality of search results corresponding to the selected suggested query, wherein each search result matches the query tokens of the selected suggested query.

14. A social-networking system comprising: one or more processors; and a memory coupled to the processors comprising instructions executable by the processors, the processors operable when executing the instructions to:
receive, at the social-networking system of an online social network from a mobile-client system of a first user associated with the online social network, an indication of a first location of the first user;
identify, by the social-networking system, one or more objects associated with the online social network based at least on the first location, each object having a corresponding name string;
generate, by the social-networking system, automatically in response to receiving the indication of the first location, one or more suggested queries based on the location of the first user, wherein each suggested query comprises query tokens associated with one or more of the identified objects, and wherein at least one of the query tokens of each suggested query is the name string corresponding to at least one of the identified objects;

push, from the social-networking system, to the mobile-client system automatically in response to receiving the indication of the first location, a notification comprising one or more of the suggested queries, each suggested query being selectable by the first user to retrieve search results corresponding to the suggested query;

receive, at the social-networking system, from the mobile-client system, an indication the first user has selected one of the suggested queries;

execute, by the social-networking system, the selected suggested query; and send, from the social-networking system, to the mobile-client system in response to receiving the indication of the selection, a plurality of search results corresponding to the selected suggested query, wherein each search result matches the query tokens of the selected suggested query.

15. The system of claim 14, the processors being further operable when executing the instructions to generate one or more search results corresponding to the selected suggested query.

16. The system of claim 14, the processors being further operable when executing the instructions to calculate a score for each of the generated suggested queries, wherein the notification comprise one or more suggested queries having a score greater than a threshold score.

17. The system of claim 16, wherein calculating the score for each of the generated suggested queries is based on a number of possible search results corresponding to the suggested query.

18. The system of claim 14, wherein the search results are sent via is one or more of a SMS message, a MMS message, an email message, a banner notification, a pop-up notification, an in-app notification, a cloud-to-device notification, or any combination thereof.

19. The system of claim 14, wherein the one or more suggested queries are based on natural-language strings generated by a context-free grammar model.

20. The system of claim 14, wherein the first location is indicated by one or more of a global position system (GPS) signal, a Wi-Fi signal, or a cellular radio signal.

* * * * *